June 5, 1934. J. H. LONG 1,961,423
HEATER
Filed May 21, 1932
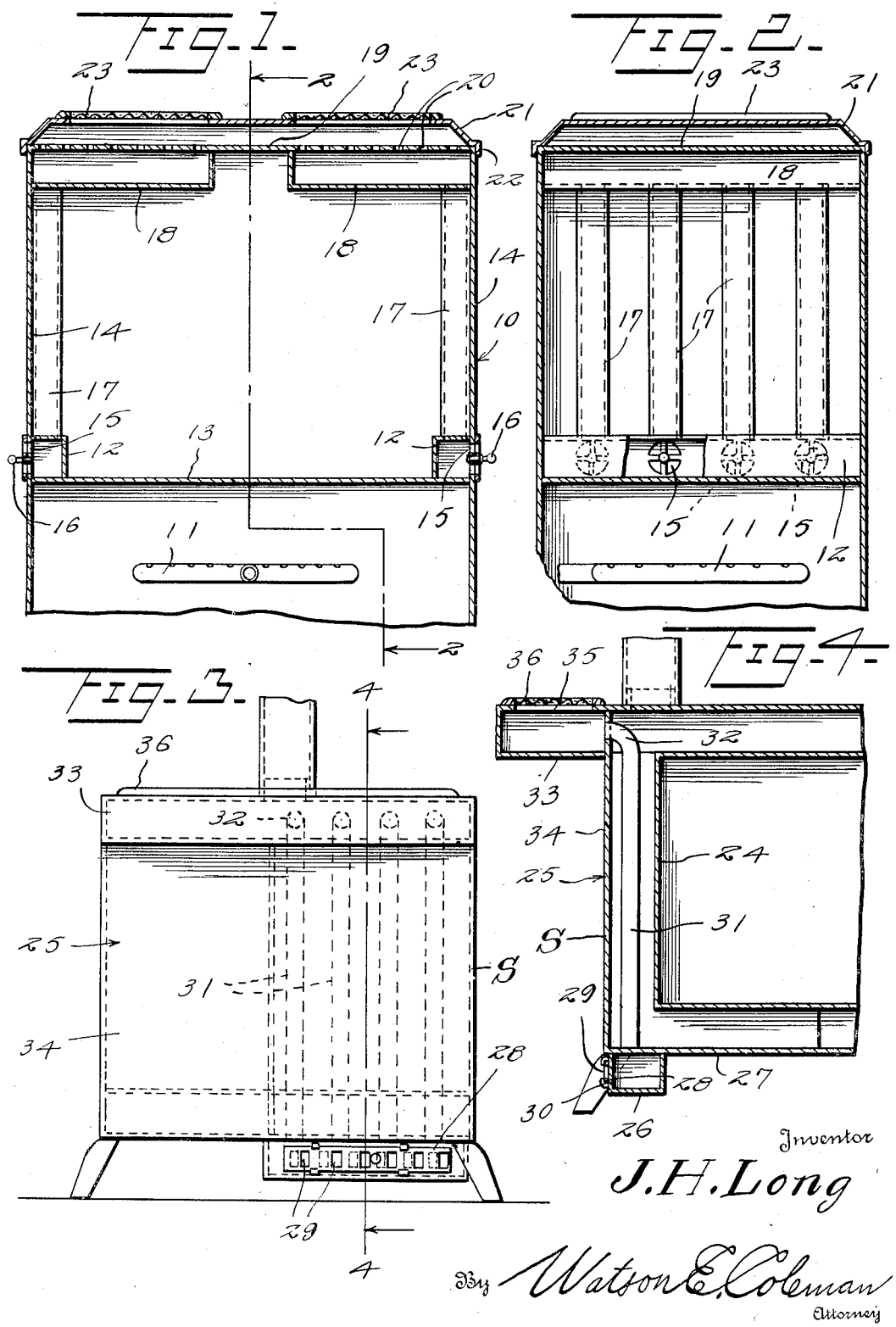

Patented June 5, 1934

1,961,423

UNITED STATES PATENT OFFICE 1,961,423

HEATER

Joseph H. Long, Cleveland, Ohio

Application May 21, 1932, Serial No. 612,796

2 Claims. (Cl. 126—4)

This invention relates to heaters and more particularly to a heating means which may be combined with an oven construction so as to heat the air in the room in addition to heating the interior of the oven.

Another object of this invention is to provide a heating attachment which can be mounted on stoves without interfering with the normal use of the stoves so as to heat the air in the room, if desired, in addition to heating the interior of the oven.

A further object of this invention is to provide a construction of this kind means controllable exteriorly from the oven for admitting any desired quantity of air through the heating means during the heating of the oven.

The above and various other objects and advantages of this invention will in part be described and in part be understood from the following detailed description of the present preferred embodiment, the same being illustrated in the accompanying drawing wherein:—

Figure 1 is a fragmentary vertical section taken through an oven construction having a device constructed according to the preferred embodiment of this invention mounted therein.

Figure 2 is a sectional view taken on the line 2—2 of Figure 1.

Figure 3 is a detail end elevation of another stove or heating means having a modified form of this heating construction mounted therein.

Figure 4 is a fragmentary sectional view taken on the line 4—4 of Figure 3.

Referring to the drawing wherein like numerals of reference designate corresponding parts throughout the several views, the numeral 10 designates generally an oven construction having a burner or heating means 11 mounted below the bottom wall 13 thereof. This heating means including the oven 10 and the burner 11 is of conventional construction and may be either a gas, oil or electrically heated oven inasmuch as the burner 11 is only diagrammatic of the heating means.

A pair of lower manifolds 12 are mounted one on each side of the oven 10, and the outer or vertical wall 14 of the oven 10 is provided with a plurality of openings or apertures 15 which can be selectively closed or controlled by means of manually operated dampers 16. A plurality of air heating tubes 17 are connected at the lower end thereof to the manifold 12 and extend vertically along the inner surface of the vertical wall 14 of the oven 10.

An upper manifold 18 is connected to the upper end of the vertical heating tubes 17 and the upper surface or top of the manifold 18 is open and engages the top wall 19 of the oven 10. This top wall 19 is provided with a plurality of outlets or passages 20 so as to permit the air passing upwardly through the heating tubes 17 and which is heated thereby to pass outwardly of the top wall 19.

A top member 21 provided with marginal flanges 22 removably engages the top 19 of the oven and this top plate 21 is provided with a grating or grill 23, there being one grill for each manifold 18.

As shown in Figure 3, the stove or heating member S is provided with an oven 24 which is positioned in spaced relation to an outer jacket 25. At the rear or other desired point of the stove S, I have provided a manifold 26 which is secured to the bottom wall 27 of the stove S and this manifold is provided with a plurality of inlet openings 28 so as to permit cold air to pass into the manifold. The openings 28 may be closed by a slidable damper 29 which is mounted on guides 30 on the rear wall of the manifold 26.

A plurality of heating pipes or members 31 are in communication at the lower end thereof with the manifold 26 and the upper ends of the heating pipes or tubes 31 are bent rearwardly, as at 32, and communicate with an upper manifold 33 secured to the rear wall 34 of the stove S. The rear wall 34 is provided with suitable openings to receive the horizontal end portions 32 of the heating pipes 31 so that the air passing through the intake openings 28 into the manifold 26 and upwardly through the heating tubes 31 will be heated thereby and passed into the upper manifold 33. This upper manifold 33 is rearwardly offset from the rear wall 34 of the outer jacket 25 and is provided with an outlet opening 35 which is covered by a grating or grill 36.

Through the provision of the heating means disclosed in the drawing, the heat ordinarily applied to the oven will not only serve to heat the oven to the desired degree but, if desired, the air within the room can be heated through the heat within the interior of the oven.

It will be readily seen that the heating means can be applied to any ordinary oven construction without unduly interfering with the present parts of the stove or heating member so that a greater percentage of the heat applied to the oven can be used for heating a room than is now possible.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An air heating means comprising the combination with a stove having an oven, of a plurality of parallel vertically disposed heating pipes disposed adjacent the wall of the oven, a lower manifold connected to the lower end of the pipes and having one wall integral with an adjacent wall of the oven, an upper manifold connected to the upper end of the pipes and having an open upper end portion and having one wall integral with an adjacent wall of the oven, means for covering the open upper end of the manifold while permitting heated air to pass outwardly of the upper manifold, and means for controlling the entrance of unheated air into the lower manifold.

2. An air heating means comprising the combination with a stove and an oven, of a plurality of vertically disposed pipe members positioned within the oven and disposed closely adjacent a vertical wall of the oven, a lower manifold connected to the lower end of the pipes, one wall of the manifold comprising a portion of a wall of the oven and having openings therethrough whereby to permit the entrance of unheated air into the lower manifold, dampers for said openings, an upper manifold having the upper wall thereof integral with the top wall of the oven and having openings therethrough and a grill supported above the top of the oven to permit the passage of heated air into the atmosphere.

JOSEPH H. LONG.